Aug. 13, 1968   N. J. SAHLSTROM   3,396,912
SLURRY HANDLING APPARATUS
Filed Dec. 3, 1964   2 Sheets-Sheet 1

INVENTOR
Nils Johan Sahlstrom

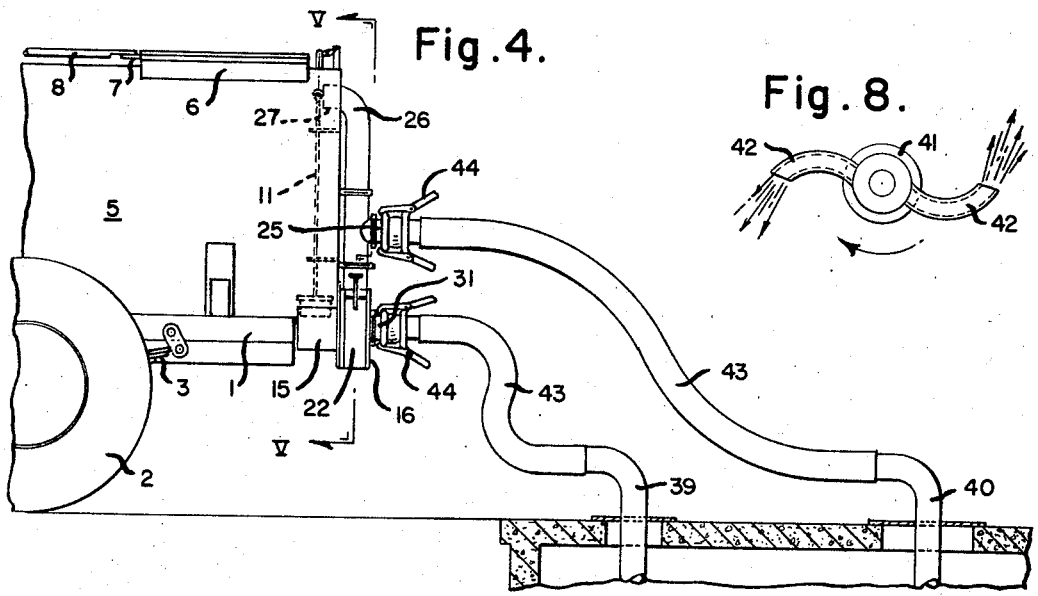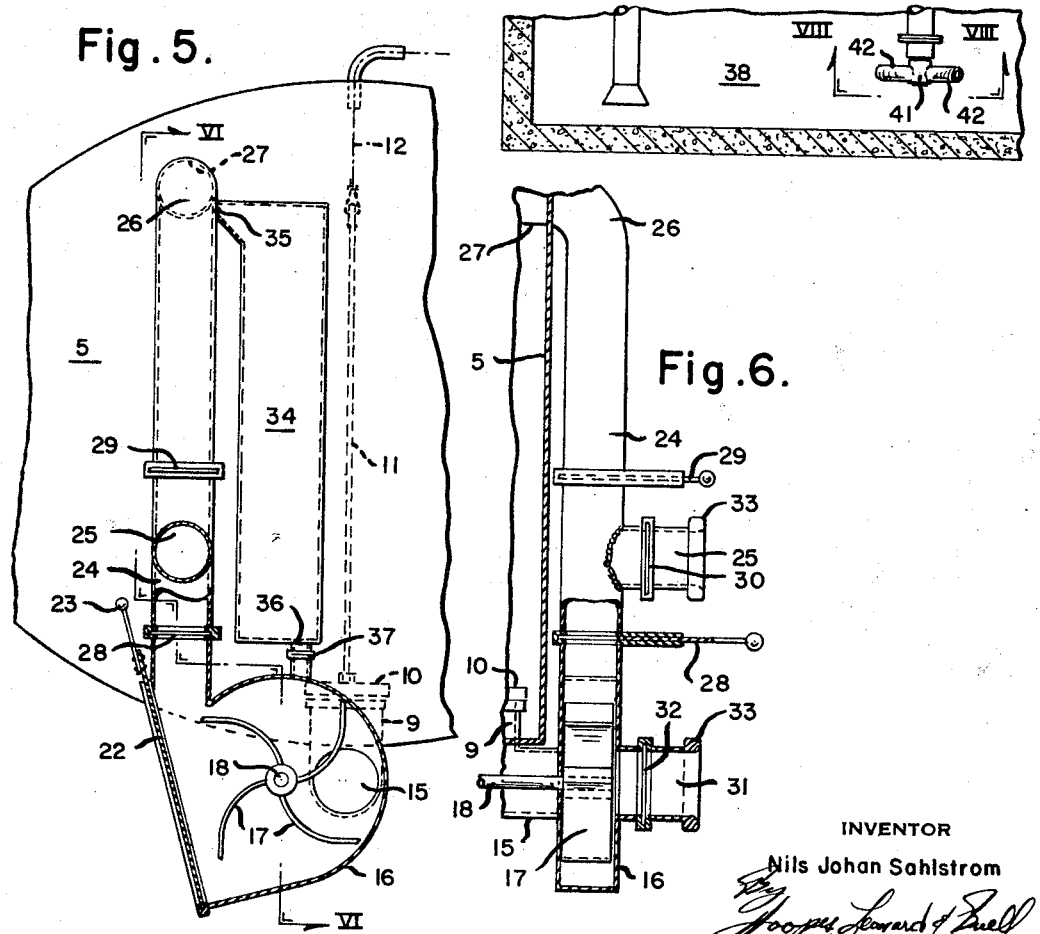

United States Patent Office 3,396,912
Patented Aug. 13, 1968

3,396,912
SLURRY HANDLING APPARATUS
Nils Johan Sahlstrom, Skovde, Sweden, assignor to Sahlstrom Manufacturing Company, Pittsburgh, Pa., a corporation of Pennsylvania
Filed Dec. 3, 1964, Ser. No. 415,635
9 Claims. (Cl. 239—665)

ABSTRACT OF THE DISCLOSURE

This application discloses a stationary collecting tank and movable tank wagon for collecting, blending, and evenly spreading slurries such as liquid manure. A pump on the tank wagon is connectable to fittings in the collecting tank for blending slurry within the tank and thereafter filling the tank wagon with the slurry. The pump is also operable to distribute the slurry across fields.

This invention relates to slurry handling apparatus and is particularly adapted for blending of barnyard and stable manure in the form of a slurry and handling the same. This invention is an improvement upon the invention set forth in my copending application Ser. No. 345,989, now Patent No. 3,263,968.

In recent years great attention has been devoted to mechanizing a wide variety of jobs performed on and about farms. Extensive use of tractors and electric power has vastly increased the possible farm production of each individual farmer while reducing the amount of physical labor required. One job in which there has been little advance, however, is that of handling and disposing of manure. As is well known, an inevitable result of the keeping of livestock is the production of manure. Customarily manure is distributed upon fields to be turned under as organic fertilizer. It is customarily moved by hand from the barn to a stockpile outside the barn and is later loaded onto a mechanical spreader for transport to the fields and distribution over them. While the use of mechanical spreaders has reduced the amount of physical labor involved, a substantial amount still remains in the handling and rehandling of the manure. In conventional methods, the liquid constituent, which is high in nitrogenous compounds is lost to a large extent by run-off, either in the barn or in the stockpile, thereby causing the loss of many valuable fertilizer elements. Moreover, when the manure is stockpiled outside, further valuable constituents are lost by reason of leaching out of those constituents.

I have invented new and useful improvements which enable barnyard manures and accompanying stable refuse to be handled and distributed over fields as slurries. The manual labor required is thereby greatly reduced. Furthermore, all of the manure constituents—liquid and solid—are recovered and preserved without loss for eventual use as fertilizer in precisely the place desired. I provide a slurry supply tank, a pump chamber, a conduit extending between the supply tank and the pump chamber, impeller means positioned within the pump chamber for rotating motion, and an opening of varying width through the circumferential wall of the pump chamber. I preferably provide an opening in the circumferential wall of the pump chamber which tapers toward one end. In the preferred form of my invention, said opening extends around said circumference approximately 90° and tapers from a point a greatest width at the top of the opening to a point of least width at the bottom of the opening. I further preferably provide a second outlet from the pump chamber to a conduit. I prefer to provide a discharge opening from the conduit to the slurry supply tank and a further discharge opening from the conduit. I provide valve means for optionally opening and closing said outlets and discharge openings. I further prefer to provide a primary tank in communication with the pump chamber and with the conduit leading from the pump chamber for storage of slurry to prime the pump. I prefer to place said apparatus on a vehicle for transport and even distribution of slurry over fields.

I further prefer to provide a fixed slurry storage tank, a pump intake member positioned within the tank, a pump discharge member including movable nozzle means for agitation of the slurry and positioned within the storage tank. I also prefer to provide conduit means extending between the pump and said pump intake member and pump discharge member for recirculation of slurry through the pump and storage tank.

Other details, objects and advantages of my invention will become more apparent as the following description of a present preferred embodiment thereof proceeds.

In the accompanying drawings I have illustrated a present preferred embodiment of my invention in which FIGURE 1 is a side view of a tank wagon having a liquid manure supply tank and pump assembly mounted thereon;

FIGURE 4 is a view, with some portions removed, showing the tank wagon, a stationary storage tank and the connections therebetween;

FIGURE 5 is a view of the pump and associated conduits upon the back of the tank wagon of FIGURE 1;

FIGURE 6 is a sectional view taken along VI—VI of FIGURE 5;

FIGURE 8 is a view taken along VIII—VIII of FIGURE 4.

Figure 1:
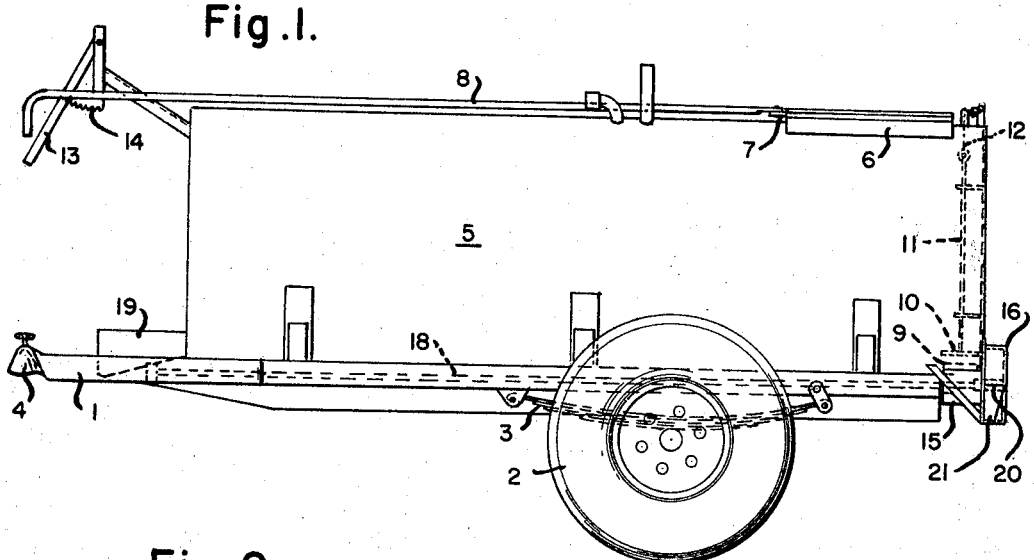
Figure 2:
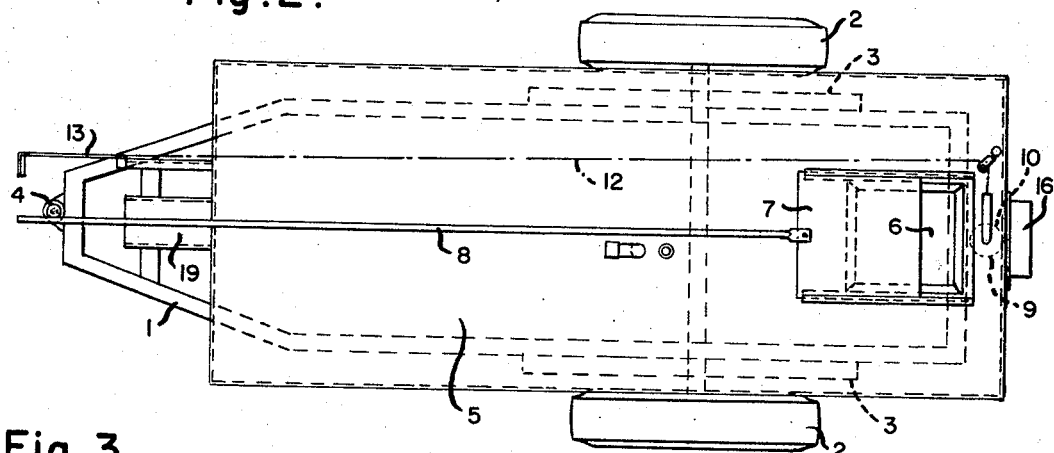
FIGURE 2 is a plan view of the tank wagon shown in FIGURE 1.
Figure 3:
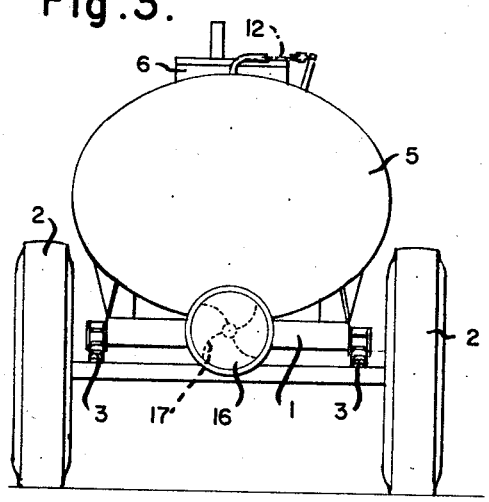
FIGURE 3 is a rear elevational view of the tank wagon shown in FIGURE 1.
Figure 7:
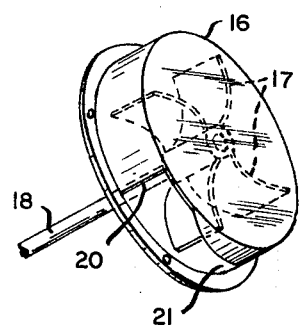
FIGURE 7 is an isometric view of the pump and shroud therefor.

The tank wagon comprises a frame 1 mounted upon pneumatic tires 2 and carried by springs 3. The forward end of frame 1 is equipped with a tractor hitch 4. A supply tank 5 is mounted upon frame 1. An access hatch 6 in the top of tank 5 has a sliding cover 7 operated by a pull rod 8. An outlet 9 is provided at the lower rear end of tank 5. A valve 10 is positioned upon the end of a vertically movable rod 11 and may be raised and lowered to open and close outlet 9. Rod 11 is lifted by a cable 12 which is guided forwardly to an operating handle 13 having a ratchet 14 by which the opening of valve 10 may be controlled and maintained constant.

Tank outlet 9 discharges into a conduit 15 which discharges through the side of a scroll case 16 forming the pump chamber of a centrifugal pump. An impeller 17 is fitted within the chamber. Impeller 17 is mounted on a shaft 18 which extends forwardly and has a coupling located beneath a guard 19 at the forward end of the tank wagon. The coupling is adapted to be connected to the power takeoff shaft of a tractor to which the tank wagon is connected.

The side of scroll case 16 has an opening in it which extends around substantially 90° of the circumference of the scroll case and which is the width of the scroll case at its upper portion 20 but which becomes progressively narrower at the lower portions as at 21. The opening may be opened and closed by a valve comprising a sliding plate 22 in guides and having an operating handle 23 attached thereto. A discharge conduit 24 leads upwardly from the discharge chamber. An outlet 25 is provided from conduit 24 a short distance above the pump chamber. Conduit 24 bends at 26 in its upper end and terminates in a discharge opening 27 discharging into tank 5. The conduit 24 may be opened and closed by operation of a sliding plate valve 28 intermediate scroll case 16 and outlet 25 and also above opening 27 by operation of a sliding plate valve above outlet 25 and below outlet 27. Outlet 25 may be opened and closed by operation of a sliding plate valve 30 positioned adjacent to the outlet. A pump inlet 31 connects to the side of scroll case 16 and may be opened and closed by a sliding plate valve 32. Outlet 25 and inlet 31 are provided with collars 33 for ready attachment of couplings thereto.

A primary storage tank 34 is positioned adjacent conduit 24. It has an inlet 35 from the top of conduit 24 and an outlet 36 is charging into scroll case 16. Outlet 36 is opened and closed by a valve 37. Tank 34 provides a source of fluid to fill scroll case 16 and prime the pump when it is first placed into operation.

A fixed storage tank 38 is provided which is preferably a concrete underground cistern or the like. A pump intake member 39 is fitted in the tank with the lower portion thereof near the bottom of the tank. A pump discharge member 40 is likewise fitted into the tank. Pump discharge 40 terminates in a spinner 41 having nozzles 42 which are directly tangentially of the spinner. Flexible tubes 43 are connected to intake and discharge members 39 and 40 and terminate in quick release couplings 44.

In operation of the apparatus, storage tank 38 is filled with collected manure from the barn to which water may be added in desired amounts. Ioses 43 are connected to the tank wagon by fitting couplings 44 over collars 33. Valves 28, 30, and 32 are opened and valves 10, 22 and 29 are closed. Valve 37 is then opened to drain slurry from tank 34 and prime the pump. The pump is driven by the attached tractor causing slurry in tank 38 to be drawn into intake member 39 through hose 43 and into the pump chamber. The slurry is then discharged through outlet 25, hose 43, member 40 and spinner 41. Slurry is discharged from nozzles 42 which causes spinner 41 to rotate directing moving streams of slurry from nozzles 42 throughout storage tank 38. The slurry in tank 38 is thereby blended into a homogeneous suspension. When the slurry is fully blended, valve 29 is opened and valves 30 and 37 are closed. Slurry is thereby pumped from storage tank 38 to supply tank 5. Primary tank 34 is likewise refilled through inlet 35. When tank 5 is filled, valve 32 is closed and couplings 44 are disconnected. Valve 10 may be opened if necessary to maintain an evenly distributed suspension within tank 5.

After the tank wagon is filled, it is pulled to the field where the liquid manure is to be distributed. Valves 10 and 28 are closed and valve 22 is opened. The tank wagon is then advanced across the field in a series of parallel courses. When it is desired to distribute manure, handle 13 is operated to open valve 10 to the desired extent. Impeller 17 then broadcasts the liquid through the opening in scroll case 16 which is exposed by the opening of valve 22. The tapered opening having its lower end coverage from a point adjacent the side of the tank wagon narrower than the upper causes a substantially even coverage from a point adjacent the side of the tank wagon to the limit of throw of the pump. When tank 5 has been emptied, the tank wagon is returned to storage tank 38 and refilled.

The invention provides a single power unit which may be employed to blend and agitate slurries in the fixed storage tank, to pump slurry therefrom to the tank wagon, to agitate slurry within the tank wagon, and to distribute a uniformly blended slurry from the tank wagon across the field. The foregoing advantages are obtained from a single unit by the simple expedient of adjusting appropriate valves. It will be seen that the manure may be readily and economically handled without the disadvantages of conventional systems.

While I have illustrated and described a present preferred embodiment of my invention, it is to be understood that I do not limit myself thereto and that the invention may be otherwise variously practiced within the scope of the following claims.

I claim:
1. A slurry spreader for evenly distributing slurry across an open field comprising a slurry supply tank, a pump chamber adjacent thereto, slurry conduit means extending between the slurry supply tank and the pump chamber, impeller means rotatably mounted within the pump chamber, impeller drive means in driving connection to the impeller, and a slurry outlet from the pump chamber, including an opening in the circumferential wall of the pump chamber, which opening is tapered toward the lower end thereof.

2. A slurry spreader as ilaimed in claim 1 in which the opening in the wall of the pump chamber extends from about the bottom point on the circumference a distance of approximately 90° to about the mid point between top and bottom of the circumference.

3. A slurry spreader for distributing slurry evenly across a field, comprising a slurry supply tank, a pump chamber associated therewith and arranged to receive slurry from the slurry supply tank, impeller means positioned within the pump chamber and having radially extending blades, impeller drive means, a slurry inlet to the chamber adjacent the axis of the impeller, a slurry outlet from the chamber comprising a tapered opening which is narrowest in the bottom portion of the circumferential wall of the pump chamber and broadens as the opening extends upwardly in the circumferential wall.

4. Slurry handling apparatus comprising a slurry supply tank, a pump compartment adjacent thereto, impeller means rotatably mounted within the pump compartment, impeller drive means in driving connection to the impeller, a pump inlet in communication with the slurry supply tank, a second pump inlet adapted to be connected to a slurry storage tank, a pump outlet for discharge of slurry from the pump to at least one of the slurry supply tanks and the slurry storage tank, and a second pump outlet having a tapered, elongated orifice.

5. Slurry handling apparatus comprising a slurry supply tank, a pump chamber adjacent thereto, impeller means mounted within the pump chamber and having radially extending blades, impeller drive means connected to the impeller, a pump inlet in communication with the slurry supply tank, a second pump inlet adapted to be connected to a slurry storage tank, a pump outlet in communication with the slurry supply tank and adapted to be connected to the slurry storage tank, a second pump outlet including an orifice having an opening tapered toward one end, and valve means associated with the pump inlets and outlets whereby they may be selectively opened and closed.

6. Slurry handling apparatus comprising a slurry supply tank, a pump chamber adjacent thereto, impeller means mounted within the pump chamber and having radially extending blades, impeller drive means connected to the impeller, a pump inlet in communication with the slurry supply tank, a second pump inlet adapted to be connected to a slurry storage tank, a pump outlet in communication with the slurry supply tank and adapted to be connected to the slurry storage tank, a second pump outlet including an orifice of generally upright rectangular shape and tapered inwardly toward the bottom portion of said orifice, said orifice being placed to direct slurry outwardly from a point adjacent the orifice to a point remote from the orifice.

7. Slurry handling apparatus comprising a slurry supply tank, pump means adjacent thereto, a slurry storage tank, pump inlet means in communication with the slurry supply tank and adapted to be connected to the slurry storage tank, pump outlet means in communication with the slurry supply tank and adapted to be connected to the slurry storage tank, a pump means discharge orifice disposed to direct pumped slurry across a field, agitating means positioned within the slurry storage tank, slurry suction means within the slurry storage tank, and conduit means connecting the pump outlet means to the agitating means and the slurry suction means to the pump inlet means.

8. Slurry handling apparatus comprising a slurry supply tank, pump means adjacent thereto, a slurry storage tank, pump inlet means in communication with the slurry supply tank, pump inlet means adapted to be connected to the slurry storage tank, pump outlet means in communication with the slurry supply tank and adapted to be connected to the slurry storage tank, a discharge orifice from the pump means having a generally upright rectangular opening narrowed toward its lower end and disposed to direct pumped slurry across a field, agitating means including movable nozzle means positioned within the slurry storage tank, slurry suction means placed within the slurry storage tank, and conduit means connecting the pump means to the agitating means and the slurry suction means.

9. Slurry handling apparatus as claimed in claim 8 in which the agitating means comprise spinner means having nozzle means mounted thereon for substantially horizontal discharge of slurry from said nozzles.

References Cited
UNITED STATES PATENTS

| | | | |
|---|---|---|---|
| 3,136,485 | 6/1964 | Bellows et al. | 239—172 |
| 3,206,215 | 9/1964 | De Jong | 275—8 X |
| 3,294,407 | 12/1966 | Vander Pol | 275—4 X |

FOREIGN PATENTS

| | | |
|---|---|---|
| 1,269,267 | 4/1961 | France. |
| 643,803 | 8/1962 | Italy. |

OTHER REFERENCES

German Printed Application 609,578, August 1956, Schmidt et al.

M. HENSON WOOD, JR., *Primary Examiner.*

V. M. WIGMAN, *Assistant Examiner.*

UNITED STATES PATENT OFFICE
CERTIFICATE OF CORRECTION

Patent No. 3,396,912                                                August 13, 1968

Nils Johan Sahlstrom

It is certified that error appears in the above identified patent and that said Letters Patent are hereby corrected as shown below:

Column 3, line 28, "Ioses" should read -- Hoses --; line 57, cancel "coverage from a point adjacent the side of the tank wagon". Column 4, line 14, "ilaimed" should read -- claimed --.

Signed and sealed this 10th day of February 1970.

(SEAL)
Attest:

Edward M. Fletcher, Jr.                           WILLIAM E. SCHUYLER, JR.
Attesting Officer                                            Commissioner of Patents